United States Patent [19]

Sakumoto et al.

[11] Patent Number: 5,428,113
[45] Date of Patent: Jun. 27, 1995

[54] PIPERAZINYLETHYLAMINOCARBONYL-CONTAINING BUTADIENE-ACRYLONITRILE COPOLYMER AND PROCESS FOR PRODUCING THE SAME

[75] Inventors: Yukinori Sakumoto; Takeshi Hashimoto; Katsuji Nakaba; Masaharu Kobayashi; Takeshi Nishigaya; Fumiyoshi Yamanashi, all of Shizuoka, Japan

[73] Assignee: Tomoegawa Paper Co., Ltd., Tokyo, Japan

[21] Appl. No.: 324,542

[22] Filed: Oct. 18, 1994

[30] Foreign Application Priority Data

Oct. 22, 1993 [JP] Japan .................................. 5-286203

[51] Int. Cl.⁶ .................................................. C08F 8/32
[52] U.S. Cl. ................................... 525/329.3; 525/375
[58] Field of Search ............................... 525/329.3, 375

[56] References Cited

U.S. PATENT DOCUMENTS

| 4,301,195 | 11/1981 | Mercer et al. | 525/329.3 |
| 5,312,873 | 5/1994 | Gregor et al. | 525/329.3 |
| 5,362,785 | 11/1994 | Inui et al. | 525/329.3 |

FOREIGN PATENT DOCUMENTS 50-27486  9/1975  Japan .

OTHER PUBLICATIONS

"Production of Carboxylated Latices by Emulsion Polymerization", D. C. Blackley, NATO Adv. Study Inst. Ser. E 67, pp. 203–219, 1983.

*Primary Examiner*—Bernard Lipman
*Attorney, Agent, or Firm*—Lowe, Price, LeBlanc & Becker

[57] ABSTRACT

The piperazinylethylaminocarbonyl-containing butadiene-acrylonitrile copolymer of this invention is a novel substance useful as an adhesive component for adhesive tapes, which tapes are used in the interior of a resin-sealed type semiconductor device. The copolymer has a weight average molecular weight of 10,000–200,000, and is represented by the following general formula (I) and obtained by condensing a carboxyl-containing butadiene-acrylonitrile copolymer having a weight average molecular weight of 10,000–200,000 with N-aminoethylpiperazine in the presence of a phosphite and a pyridine derivative to undergo the amidation.

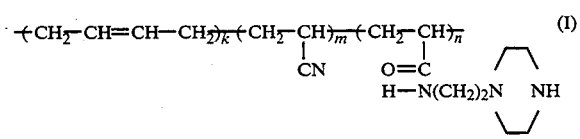

wherein k, m, and n indicate molar proportions, where n is taken as 1, k is a number in the range of 3–175, and m is a number in the range of 0.3–93.

4 Claims, No Drawings

PIPERAZINYLETHYLAMINOCARBONYL-CONTAINING BUTADIENE-ACRYLONITRILE COPOLYMER AND PROCESS FOR PRODUCING THE SAME

BACKGROUND OF THE INVENTION

1) Field of the Invention

The present invention relates to a novel piperazinylethylaminocarbonyl-containing butadiene-acrylonitrile copolymer and to a process for producing the same.

2) Description of Related Arts

Conventionally, as adhesives for adhesive tapes for fixing a leadframe, which is used in the interior of a resin-sealed type semiconductor device, synthetic rubber type resins such as polyacrylonitrile, polyacrylate or acrylonitrile-butadiene copolymer are used solely, or with being modified or mixed with another resin.

The adhesive tapes, etc., for fixing a leadframe are required not only to possess good reliability at a level required for semiconductor and processability at the time of taping, but also to have sufficient adhesive strength immediately after taping and heat resistance sufficient for withstanding the heating at the stage of assembling a resin-sealed type semiconductor device. However, the adhesives which have conventionally been used are insufficient in heat resistance, etc., and it has been, therefore, desired to develop an adhesive which is allowed to adhesion and curing at a comparatively low temperature and has sufficient heat resistance and to develop a novel material for producing the same.

SUMMARY OF THE INVENTION

The present invention has been made based on such a requirement, and the object of the present invention is to provide a novel piperazinylethylaminocarbonyl-containing butadiene-acrylonitrile copolymer. Another object of the present invention is to provide a process for producing a novel piperazinylethylaminocarbonyl-containing butadiene-acrylonitrile copolymer.

The piperazinylethylaminocarbonyl-containing butadiene-acrylonitrile copolymer according to the present invention is obtained by the amidation of a carboxyl-containing butadiene-acrylonitrile copolymer having a weight average molecular weight of 10,000–200,000, has a weight average molecular weight of 10,000–200,000, and is represented by the following general formula (I):

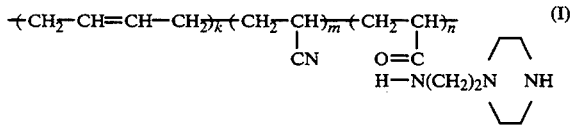

wherein k, m and n indicate molar proportions, where n is taken as 1, k is a number in the range of 3–175, and m is a number in the range of 0.3–93.

The process for producing a piperazinylethylaminocarbonyl-containing butadiene-acrylonitrile copolymer according to the present invention represented by the above-mentioned formula (I) is characterized by condensing a carboxyl-containing butadiene-acrylonitrile copolymer having a weight average molecular weight of 10,000–200,000 represented by the following general formula (II):

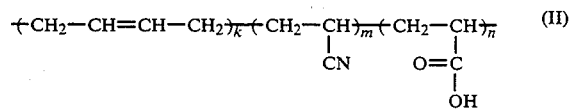

wherein k, m, and n have the same meanings as defined above, with N-aminopiperazine in the presence of a phosphite and a pyridine derivative.

DETAILED DESCRIPTION OF PREFERRED EMBODIMENTS

In the piperazinylethylaminocarbonyl-containing butadiene-acrylonitrile copolymer according to the present invention, which is represented by the above-mentioned formula (I), the molar proportions of each of the monomer units are set such that when n is taken as 1, k is a number in the range of 3–175, preferably 5–175, particularly 9.2–166.5, and m is a number in the range of 0.3–93, preferably 0.9–93, particularly 1.5–74. If the value of k relative to n is lower than 3, the solubility of the copolymer in a solvent becomes low, while if it is higher than 175, when the copolymer is mixed with a compound having (a) maleimide group(s) as an adhesive component, the reactivity with such a compound is lowered, leading to the viscosity being too low, resulting in the problem of poor processability when used as an adhesive. If the value of m relative to n is lower than 0.3, the solubility of the copolymer in a solvent becomes low, whereas if it exceeds 93, the problem is caused where electric insulating properties become unstable.

The content of the acrylonitrile unit in the piperazinylethylaminocarbonyl-containing butadiene-acrylonitrile copolymer is preferably from 5 to 50% by weight, particularly in the range of 10–40% by weight. If it is lower than 5% by weight, the solubility of the copolymer in a solvent becomes low. Conversely, a content exceeding 50% by weight is not preferable, because of unstable insulating properties.

The piperazinylethylaminocarbonyl-containing butadiene-acrylonitrile copolymer according to the present invention has a weight average molecular weight of 10,000–200,000. A weight average molecular weight lower than 10,000 results in insufficient thermal stability, leading to deceased heat resistant. If the weight average molecular weight is higher than 200,000, the solubility of the copolymer in a solvent becomes low and the melt viscosity is also increased. This leads to poor workability when used as an adhesive, thereby lacking in adhesion properties.

The value of the weight average molecular weight is measured under the following conditions: Device: GPC produced from SHOWA DENKO K.K.; Pump: PU-980; Detector: UV-970. RI-71; Integrator: Sic Labchart 180 produced from System Instruments; Columns: KF-801, KF-802, and KF-803, all produced from SHOWA DENKO K.K.; Column Temperature: 20° C.; Eluent: tetrahydrofuran; Flow Amount of Eluent: 1.0 ml/min.; Sample Concentration: 0.2% by weight; Standard: polystyrene.

The piperazinylethylaminocarbonyl-containing butadiene-acrylonitrile copolymer according to the present invention preferably possesses an amino equivalent of 500–10,000. The term "amino equivalent" used herein means a molecular weight for donating one N-H proton of the amino group, and this can be determined by the known method where a sample is subjected to acid-base titration with hydrochloric acid. If the amino equivalent is lower than 500, the solubility in a solvent becomes low. On the other hand, if it exceeds 10,000, the viscosity becomes too low when mixed with a maleimide compound in order to be used as an adhesive. This is not preferable because of decreased workability of the adhesive.

The piperazinylethylaminocarbonyl-containing butadiene-acrylonitrile copolymer according to the present invention can be synthesized by condensing a carboxyl-containing butadiene-acrylonitrile copolymer having a weight average molecular weight of 10,000–200,000 represented by the above-mentioned formula (II) with N-aminoethylpiperazine.

The amidation with N-aminoethylpiperazine can be carried out by the known amidation reaction where a carboxylic acid is condensed with an amine, for example, a method by means of thermal dehydrogenation, or a method carried out in a solvent using a condensing agent., etc., being acceptable.

Examples of solvents which can be used are toluene, benzene, chlorobenzene, dichlorobenzene, acetonitrile, pyridine, tetrahydrofuran, acetic anhydride, dichloromethane, hexane, cyclohexane, dimetylformamide, dimethylacetamide, dimethylsulfoxide, N-methyl-2-pyrolidone, n-butanol, t-butanol, etc.

Optionally, in order to enhance a solvatation of the proton solvent or to regulate any side reaction, inorganic salts, such as lithium chloride and calcium chloride can be preferably added.

Examples of condensing agents which can be used are phosphites, such as triphenyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, and di-p-chlorophenyl phosphite; dicyclohexylcarbondiimide, triphenyl phosphate, diphenyl phosphonate, etc.

The above condensation reaction is preferably carried out using a phosphite as the condensing agent in the presence of a pyridine derivative. In a reaction carried out in their coexistence, a high temperature is not required, and side-reactions such as decomposition of the acrylonitrile-butadine chain can be avoided. Examples of pyridine derivatives which can be used include pyridine, 2-picoline, 3-picoline, 4-picoline, 2,4-lutidine, 2,6-lutidine, 3,5-lutidine, etc.

The reaction temperature is preferably within a range of 60°–200° C., and as for the reaction period, the reaction is carried out for several minutes to 24 hours. If desired, the water formed in the course of the reaction may be eliminated in order to select reaction conditions such that the equilibrium is shifted toward the production system.

The carboxyl-containing butadiene-acrylonitrile copolymer represented by the above-mentioned formula (II) which is used as the raw substance can be produced by any known method such as described in Japanese Patent Publication 27486/1975, or in D. C. Blackley, NATO Adv. Study Inst. Ser. E 67, pp. 203–219 (1983), "Production of carboxylated latices by emulsion polymerization".

The piperazinylethylaminocarbonyl-containing butadiene-acrylonitrile copolymer is a novel substance useful as an adhesive component for adhesive tapes, which tapes are used in the interior of a resin-sealed type semiconductor device. For example, it is mixed with a compound having at least two maleimide groups and a curing agent to be used as a curing adhesive of an adhesive tape for fixing a leadframe in a semiconductor device.

EXAMPLES

Example 1

To 900 g of toluene were added 100 g of a butadiene-acrylonitrile copolymer having a weight average molecular weight of 20,000, an acrylonitrile content of 20% by weight, and a carboxyl equivalent of 1,000 ($n=1$, $k=12.3$, and $m=3.1$), 13 g of N-aminoethylpiperazine, 7 g of pyridine, 15.5 g of triphenyl phosphite, 2.5 g of calcium chloride, and 1 g of lithium chloride, and the resulting solution was stirred for 5 hours at 120° C. After left cooling, the reaction mixture solution was poured into 2 kg of methanol, stirred for one hour at room temperature, and the solid separated was filtered. The resulting solid was washed with methanol, and dried to obtain a pyperazinylethylaminocarbonyl-containing butadiene-acrylonitrile copolymer in an amount of 110 g.

The resulting piperazinylethylaminocarbonyl-containing butadiene-acrylonitrile copolymer had a weight average molecular weight of 20,000. An infrared spectrum analysis showed absorption due to nitrile bonding at 2200 cm$^{-1}$, absorption due to amide bonding at 1650 cm$^{-1}$, and absorption due to piperazine ring at 1560 cm$^{-1}$. As a result of the titration with hydrochloric acid, the amino equivalent was found to be 1,010. From these results, the proportions of the copolymerization in the copolymer were confirmed to be $k=12.3$ and $m=3.1$, relative to $n=1$, and the chemical construction of the copolymer to be as follows:

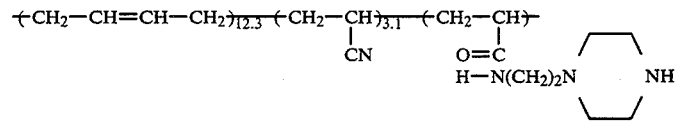

The raw material butadiene-acrylonitrile copolymer used above were here synthesized according to the method described in Japanese Patent Publication 27486/1975.

Eample 2

A piperazinylethylaminocarbonyl-containing butadiene-acrylonitrile copolymer was obtained in an amount of 111 g in the same manner as in Example 1, except that a butadiene-acrylonitrile copolymer having a weight average molecular weight of 20,000, an acrylonitrile content of 20% by weight, and a carboxyl equivalent of 2,000 ($n=1$, $k=27.4$, and $m=6.9$) was used instead of the butadiene-acrylonitrile copolymer in Example 1.

The weight average molecular weight of the resulting piperazinylethylaminocarbonyl-containing butadiene-acrylonitrile copolymer was 19,900.

As a result of infrared spectrum analysis, absorption spectra were confirmed in the same manner as in Example 1. The amino equivalent was found to be 1,980. From these results, the proportions of the copolymerization in the copolymer were confirmed to be k=27.4 and m=6.9, relative to n=1.

Example 3

A piperazinylethylaminocarbonyl-containing butadiene-acrylonitrile butadiene-acrylonitrile copolymer was obtained in an amount of 113 g in the same manner as in Example 1, except that a butadiene-acrylonitrile copolymer having a weight average molecular weight of 20,000, an acrylonitrile content of 20% by weight, and a carboxyl equivalent of 4,000 (n=1, k=57.6, and m=14.4) was used instead of the butadiene-acrylonitrile copolymer in Example 1.

The weight average molecular weight of the resulting piperazinylethylaminocarbonyl-containing butadiene-acrylonitrile copolymer was 20,100.

As a result of infrared spectrum analysis, absorption spectra were confirmed in the same manner as in Example 1. The amino equivalent was found to be 4,050. From these results, the proportions of the copolymerization in the copolymer were confirmed to be k=57.6 and m=14.4, relative to n=1.

Example 4

A piperazinylethylaminocarbonyl-containing butadiene-acrylonitrile copolymer was obtained in an amount of 109 g in the same manner as in Example 1, except that a butadiene-acrylonitrile copolymer having a weight average molecular weight of 20,000, an acrylonitrile content of 20% by weight, and a carboxyl equivalent of 8,000 (n=1, k=118.0, and m=29.5) was used instead of the butadiene-acrylonitrile copolymer in Example 1.

The weight average molecular weight of the resulting piperazinylethylaminocarbonyl-containing butadiene-acrylonitrile copolymer was 19,800.

As a result of infrared spectrum analysis, absorption spectra were confirmed in the same manner as in Example 1. The amino equivalent was found to be 8,100. From these results, the proportions of the copolymerization in the copolymer were confirmed to be k=118.0 and m=29.5, relative to n=1.

Example 5

A piperazinylethylaminocarbonyl-containing butadiene-acrylonitrile copolymer was obtained in an amount of 110 g in the same manner as in Example 1, except that a butadiene-acrylonitrile copolymer having a weight average molecular weight of 20,000, an acrylonitrile content of 30% by weight, and a carboxyl equivalent of 4,000 (n=1, k=50.4, and m=21.6) was used instead of the butadiene-acrylonitrile copolymer in Example 1.

The weight average molecular weight of the resulting piperazinylethylaminocarbonyl-containing butadiene-acrylonitrile copolymer was 20,200.

As a result of infrared spectrum analysis, absorption spectra were confirmed in the same manner as in Example 1. The amino equivalent was found to be 3,990. From these results, the proportions of the copolymerization in the copolymer were confirmed to be k=50.4 and m=21.6, relative to n=1.

Example 6

A piperazinylethylaminocarbonyl-containing butadiene-acrylonitrile copolymer was obtained in an amount of 108 g in the same manner as in Example 1, except that a butadiene-acrylonitrile copolymer having a weight average molecular weight of 70,000, an acrylonitrile content of 20% by weight, and a carboxyl equivalent of 1,000 (n=1, k=12.3, and m=3.1) was used instead of the butadiene-acrylonitrile copolymer in Example 1.

The weight average molecular weight of the resulting piperazinylethylaminocarbonyl-containing butadiene-acrylonitrile copolymer was 70,300.

As a result of infrared spectrum analysis, absorption spectra were confirmed in the same manner as in Example 1. The amino equivalent was found to be 990. From these results, the proportions of the copolymerization in the copolymer were confirmed to be k=12.3 and m=3.1, relative to n=1.

Example 7

A piperazinylethylaminocarbonyl-containing butadiene-acrylonitrile copolymer was obtained in an amount of 113 g in the same manner as in Example 1, except that a butadiene-acrylonitrile copolymer having a weight average molecular weight of 70,000, an acrylonitrile content of 20% by weight, and a carboxyl equivalent of 2,000 (n=1, k=27.4, and m=6.9) was used instead of the butadiene-acrylonitrile copolymer in Example 1.

The weight average molecular weight of the resulting piperazinylethylaminocarbonyl-containing butadiene-acrylonitrile copolymer was 70,000.

As a result of infrared spectrum analysis, absorption spectra were confirmed in the same manner as in Example 1. The amino equivalent was found to be 2,000. From these results, the proportions of the copolymerization in the copolymer were confirmed to be k=27.4 and m=6.9, relative to n=1.

Example 8

A piperazinylethylaminocarbonyl-containing butadiene-acrylonitrile copolymer was obtained in an amount of 112 g in the same manner as in Example 1, except that a butadiene-acrylonitrile copolymer having a weight average molecular weight of 70,000, an acrylonitrile content of 20% by weight, and a carboxyl equivalent of 4,000 (n=1, k=57.6, and m=14.4) was used instead of the butadiene-acrylonitrile copolymer in Example 1.

The weight average molecular weight of the resulting piperazinylethylaminocarbonyl-containing butadiene-acrylonitrile copolymer was 69,700.

As a result of infrared spectrum analysis, absorption spectra were confirmed in the same manner as in Example 1. The amino equivalent was found to be 4,020. From these results, the proportions of the copolymerization in the copolymer were confirmed to be k=57.6 and m=14.4, relative to n=1.

Example 9

A piperazinylethylaminocarbonyl-containing butadiene-acrylonitrile copolymer was obtained in an amount of 107 g in the same manner as in Example 1, except that a butadiene-acrylonitrile copolymer having a weight average molecular weight of 70,000, an acrylonitrile content of 20% by weight, and a carboxyl equivalent of 8,000 (n=1, k=118.0, and m=29.5) was used instead of the butadiene-acrylonitrile copolymer in Example 1.

The weight average molecular weight of the resulting piperazinylethylaminocarbonyl-containing butadiene-acrylonitrile copolymer was 69,800.

As a result of infrared spectrum analysis, absorption spectra were confirmed in the same manner as in Example 1. The amino equivalent was found to be 7,980. From these results, the proportions of the copolymerization in the copolymer were confirmed to be k=118.0 and m=29.5, relative to n=1.

Example 10

A piperazinylethylaminocarbonyl-containing butadiene-acrylonitrile copolymer was obtained in an amount of 111 g in the same manner as in Example 1, except that a butadiene-acrylonitrile copolymer having a weight average molecular weight of 70,000, an acrylonitrile content of 25% by weight, and a carboxyl equivalent of 1,000 (n=1, k=11.5, and m=3.9) was used instead of the butadiene-acrylonitrile copolymer in Example 1.

The weight average molecular weight of the resulting piperazinylethylaminocarbonyl-containing butadiene-acrylonitrile copolymer was 70,000.

As a result of infrared spectrum analysis, absorption spectra were confirmed in the same manner as in Example 1. The amino equivalent was found to be 1,020. From these results, the proportions of the copolymerization in the copolymer were confirmed to be k=11.5 and m=3.9, relative to n=1.

Example 11

A piperazinylethylaminocarbonyl-containing butadiene-acrylonitrile copolymer was obtained in an amount of 108 g in the same manner as in Example 1, except that a butadiene-acrylonitrile copolymer having a weight average molecular weight of 70,000, an acrylonitrile content of 25% by weight, and a carboxyl equivalent of 2,000 (n=1, k=25.7, and m=8.6) was used instead of the butadiene-acrylonitrile copolymer in Example 1.

The weight average molecular weight of the resulting piperazinylethylaminocarbonyl-containing butadiene-acrylonitrile copolymer was 70,200.

As a result of infrared spectrum analysis, absorption spectra were confirmed in the same manner as in Example 1. The amino equivalent was found to be 2,110. From these results, the proportions of the copolymerization in the copolymer were confirmed to be k=25.7 and m=8.6, relative to n=1.

Example 12

A piperazinylethylaminocarbonyl-containing butadiene-acrylonitrile copolymer was obtained in an amount of 110 g in the same manner as in Example 1, except that a butadiene-acrylonitrile copolymer having a weight average molecular weight of 70,000, an acrylonitrile content of 25% by weight, and a carboxyl equivalent of 4,000 (n=1, k=54, and m=18) was used instead of the butadiene-acrylonitrile copolymer in Example 1.

The weight average molecular weight of the resulting piperazinylethylaminocarbonyl-containing butadiene-acrylonitrile copolymer was 69,700.

As a result of infrared spectrum analysis, absorption spectra were confirmed in the same manner as in Example 1. The amino equivalent was found to be 4,080. From these results, the proportions of the copolymerization in the copolymer were confirmed to be k=54 and m=18, relative to n=1.

Example 13

A piperazinylethylaminocarbonyl-containing butadiene-acrylonitrile copolymer was obtained in an amount of 106 g in the same manner as in Example 1, except that a butadiene-acrylonitrile copolymer having a weight average molecular weight of 70,000, an acrylonitrile content of 25% by weight, and a carboxyl equivalent of 8,000 (n=1, k=110.6, and m=36.9) was used instead of the butadiene-acrylonitrile copolymer in Example 1.

The weight average molecular weight of the resulting piperazinylethylaminocarbonyl-containing butadiene-acrylonitrile copolymer was 69,700.

As a result of infrared spectrum analysis, absorption spectra were confirmed in the same manner as in Example 1. The amino equivalent was found to be 8,050. From these results, the proportions of the copolymerization in the copolymer were confirmed to be k=110.6 and m=36.9, relative to n=1.

Example 14

A piperazinylethylaminocarbonyl-containing butadiene-acrylonitrile copolymer was obtained in an amount of 109 g in the same manner as in Example 1, except that a butadiene-acrylonitrile copolymer having a weight average molecular weight of 70,000, an acrylonitrile content of 30% by weight, and a carboxyl equivalent of 4,000 (n=1, k=50.4, and m=21.6) was used instead of the butadiene-acrylonitrile copolymer in Example 1.

The weight average molecular weight of the resulting piperazinylethylaminocarbonyl-containing butadiene-acrylonitrile copolymer was 70,400.

As a result of infrared spectrum analysis, absorption spectra were confirmed in the same manner as in Example 1. The amino equivalent was found to be 3,950. From these results, the proportions of the copolymerization in the copolymer were confirmed to be k=50.4 and m=21.6, relative to n=1.

Example 15

A piperazinylethylaminocarbonyl-containing butadiene-acrylonitrile copolymer was obtained in an amount of 110 g in the same manner as in Example 1, except that a butadiene-acrylonitrile copolymer having a weight average molecular weight of 70,000, an acrylonitrile content of 35% by weight, and a carboxyl equivalent of 4,000 (n=1, k=46.8, and m=25.2) was used instead of the butadiene-acrylonitrile copolymer in Example 1.

The weight average molecular weight of the resulting piperazinylethylaminocarbonyl-containing butadiene-acrylonitrile copolymer was 70,100.

As a result of infrared spectrum analysis, absorption spectra were confirmed in the same manner as in Example 1. The amino equivalent was found to be 3,970. From these results, the proportions of the copolymerization in the copolymer were confirmed to be k=46.8 and m=25.2, relative to n=1.

Example 16

A piperazinylethylaminocarbonyl-containing butadiene-acrylonitrile copolymer was obtained in an amount of 112 g in the same manner as in Example 1, except that a butadiene-acrylonitrile copolymer having a weight average molecular weight of 150,000, an acrylonitrile content of 20% by weight, and a carboxyl equivalent of 1,000 (n=1, k=12.3, and m=3.1) was used instead of the butadiene-acrylonitrile copolymer in Example 1.

The weight average molecular weight of the resulting piperazinylethylaminocarbonyl-containing butadiene-acrylonitrile copolymer was 150,700.

As a result of infrared spectrum analysis, absorption spectra were confirmed in the same manner as in Example 1. The amino equivalent was found to be 1,050. From these results, the proportions of the copolymerization in the copolymer were confirmed to be k=12.3 and m=3.1, relative to n=1.

Example 17

A piperazinylethylaminocarbonyl-containing butadiene-acrylonitrile copolymer was obtained in an amount of 113 g in the same manner as in Example 1, except that a butadiene-acrylonitrile copolymer having a weight average molecular weight of 150,000, an acrylonitrile content of 20% by weight, and a carboxyl equivalent of 2,000 (n=1, k=27.4, and m=6.9) was used instead of the butadiene-acrylonitrile copolymer in Example 1.

The weight average molecular weight of the resulting piperazinylethylaminocarbonyl-containing butadiene-acrylonitrile copolymer was 149,600.

As a result of infrared spectrum analysis, absorption spectra were confirmed in the same manner as in Example 1. The amino equivalent was found to be 2,090. From these results, the proportions of the copolymerization in the copolymer were confirmed to be k=27.4 and m=6.9, relative to n=1.

Example 18

A piperazinylethylaminocarbonyl-containing butadiene-acrylonitrile copolymer was obtained in an amount of 113 g in the same manner as in Example 1, except that a butadiene-acrylonitrile copolymer having a weight average molecular weight of 150,000, an acrylonitrile content of 20% by weight, and a carboxyl equivalent of 4,000 (n=1, k=57.6, and m=14.4) was used instead of the butadiene-acrylonitrile copolymer in Example 1.

The weight average molecular weight of the resulting piperazinylethylaminocarbonyl-containing butadiene-acrylonitrile copolymer was 149,700.

As a result of infrared spectrum analysis, absorption spectra were confirmed in the same manner as in Example 1. The amino equivalent was found to be 4,090. From these results, the proportions of the copolymerization in the copolymer were confirmed to be k=57.6 and m=14.4, relative to n=1.

Example 19

A piperazinylethylaminocarbonyl-containing butadiene-acrylonitrile copolymer was obtained in an amount of 110 g in the same manner as in Example 1, except that a butadiene-acrylonitrile copolymer having a weight average molecular weight of 150,000, an acrylonitrile content of 20% by weight, and a carboxyl equivalent of 8,000 (n=1, k=118.0, and m=29.5) was used instead of the butadiene-acrylonitrile copolymer in Example 1.

The weight average molecular weight of the resulting piperazinylethylaminocarbonyl-containing butadiene-acrylonitrile copolymer was 149,600.

As a result of infrared spectrum analysis, absorption spectra were confirmed in the same manner as in Example 1. The amino equivalent was found to be 7,950. From these results, the proportions of the copolymerization in the copolymer were confirmed to be k=118.0 and m=29.5, relative to n=1.

Example 20

A piperazinylethylaminocarbonyl-containing butadiene-acrylonitrile copolymer was obtained in an amount of 109 g in the same manner as in Example 1, except that a butadiene-acrylonitrile copolymer having a weight average molecular weight of 150,000, an acrylonitrile content of 30% by weight, and a carboxyl equivalent of 4,000 (n=1, k=50.4, and m=21.6) was used instead of the butadiene-acrylonitrile copolymer in Example 1.

The weight average molecular weight of the resulting piperazinylethylaminocarbonyl-containing butadiene-acrylonitrile copolymer was 150,300.

As a result of infrared spectrum analysis, absorption spectra were confirmed in the same manner as in Example 1. The amino equivalent was found to be 4,100. From these results, the proportions of the copolymerization in the copolymer were confirmed to be k=50.4 and m=21.6, relative to n=1.

Application Example

To tetrahydrofuran were added 70 parts by weight of piperazinylethylaminocarbonyl-containing butadiene-acrylonitrile copolymer described in Example 14, 30 parts by weight of a compound represented by the following constructional formula, and 1 part by weight of benzoyl peroxide (produced by WAKO PURE CHEMICAL INDUSTRIES LTD.), and they were mixed to obtain a liquid adhesive having a solid content of 40%. The adhesive was applied onto a heat resistant polyimide film and then dried to obtain an adhesive tape for fixing a leadframe.

What is claimed is:

1. A piperazinylethylaminocarbonyl-containing butadiene-acrylonitrile copolymer having a weight average molecular weight of 10,000–200,000, represented by the following formula (I):

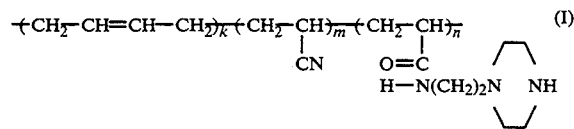

wherein k, m, and n indicate molar proportions, where n is taken as 1, k is a number in the range of 3–175, and m is a number in the range of 0.3–93.

2. The piperazinylethylaminocarbonyl-containing butadiene-acrylonitrile copolymer as claimed in claim 1, wherein the content of the acrylonitrile unit is 5–50% by weight.

3. The piperazinylethylaminocarbonyl-containing butadiene-acrylonitrile copolymer as claimed in claim 1, wherein the amino equivalent is 500–10,000.

4. A process for producing a piperazinylethylaminocarbonyl-containing butadiene-acrylonitrile copolymer having a weight average molecular weight of 10,000–200,000, represented by the following formula (I),

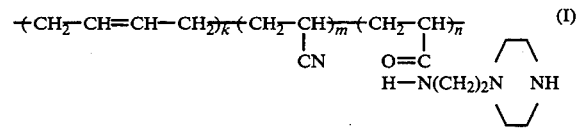

wherein k, m, and n indicate molar proportions, where n is taken as 1, k is a number in the range of 3–175, and m is a number in the range of 0.3–93, which comprises condensing a carboxyl-containing butadiene-acrylonitrile copolymer having a weight average molecular weight of 10,000–200,000 represented by the following formula (II):

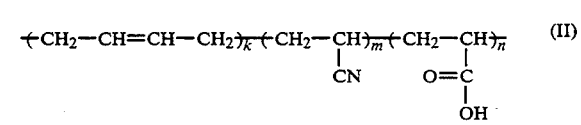

wherein k, m, and n indicate molar proportions, where n is taken as 1, k is a number in the range of 3–175, and m is a number in the range of 0.3–93, with N-aminoethylpiperazine in the presence of a phosphite and a pyridine derivative.

* * * * *